Patented Aug. 17, 1937

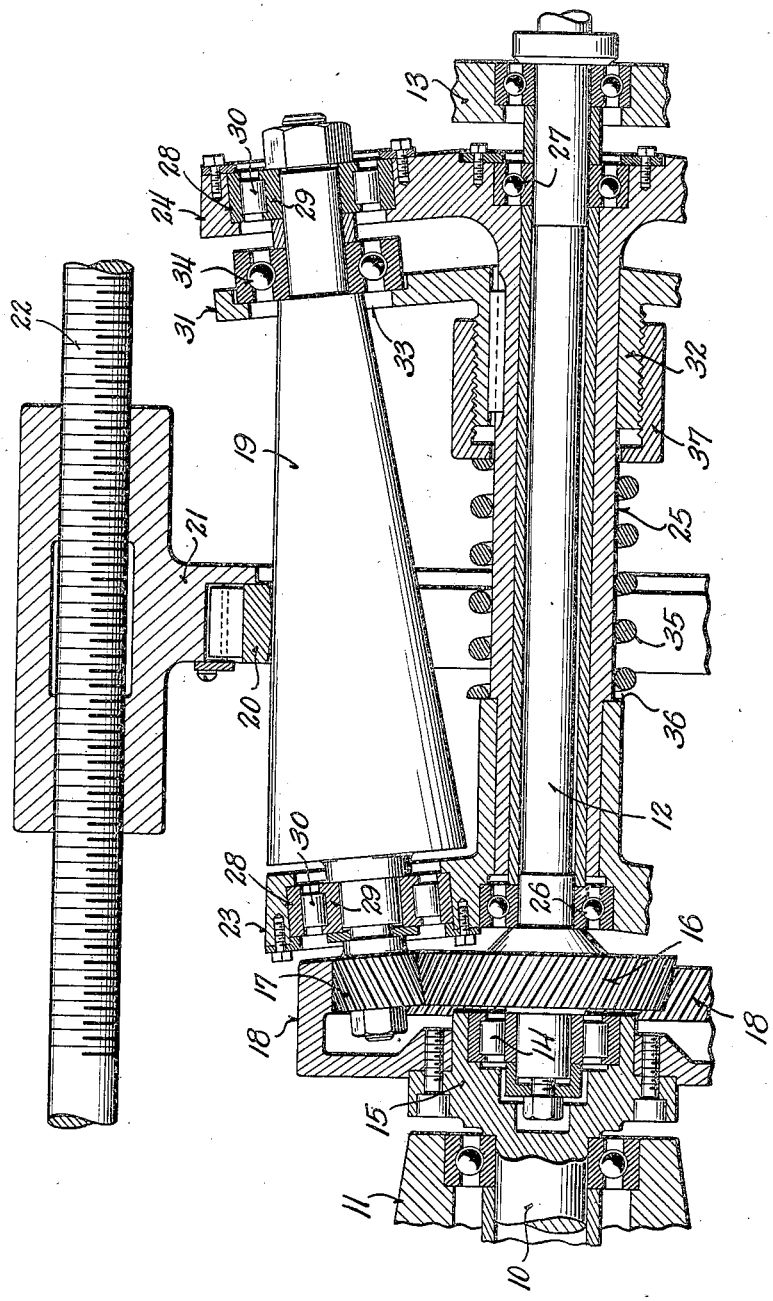

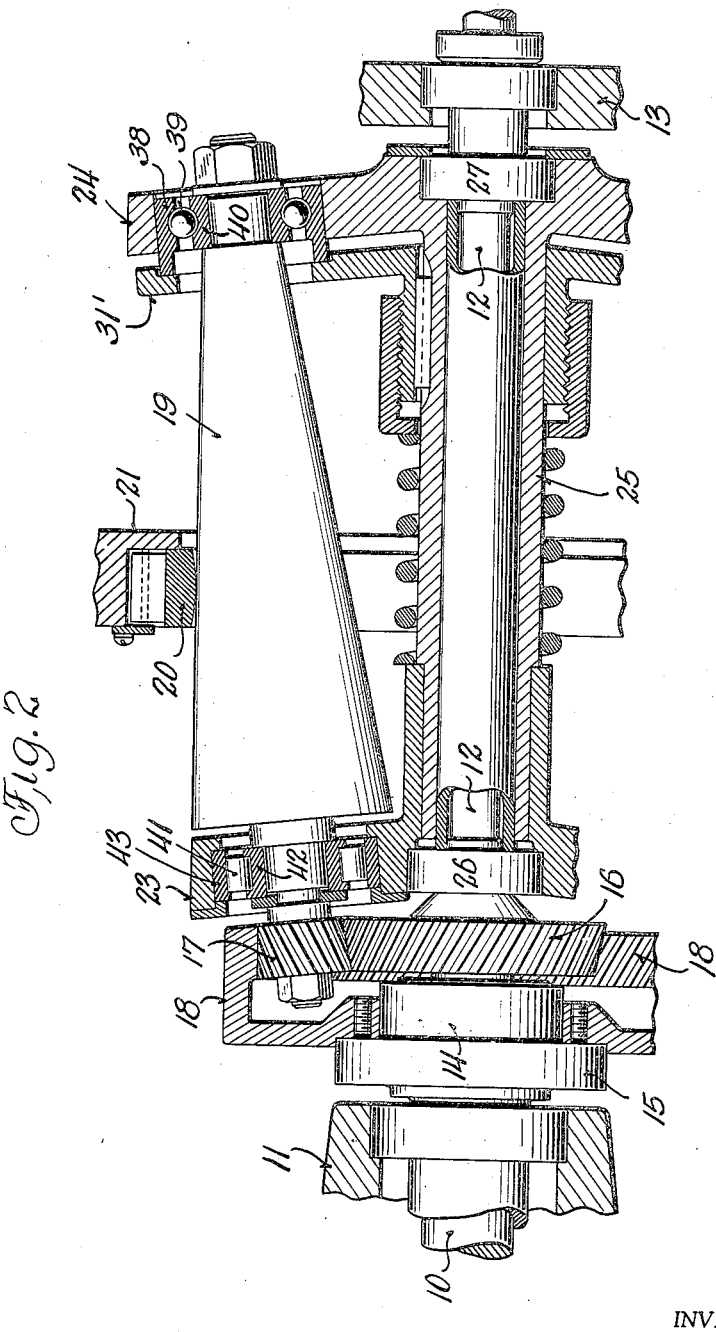

2,090,606

UNITED STATES PATENT OFFICE 2,090,606

VARIABLE SPEED TRANSMISSION

Thomas Barish, Jamestown, N. Y., assignor to The Falk Corporation, Milwaukee, Wis., a corporation of Wisconsin Application September 11, 1936, Serial No. 100,248

5 Claims. (Cl. 74—281)

This invention relates to variable speed transmissions of the type involving a set of inclined tapered planet rollers and an encircling traction ring movable lengthwise of the rollers to regulate their planetary action.

The copending application of Walter P. Schmitter and Alfred G. Bade, Serial No. 52,095, filed November 29, 1935, discloses a transmission of the type mentioned in which the required contact pressures between the rollers and ring are maintained by forcing the rollers outwardly along their respective inclined axes. In the transmission therein disclosed the opposite ends of each roller are supported in ball bearings whose inner raceways are fixed with respect thereto and whose outer raceways are slidably mounted in appropriate bearing seats so as to permit axial movement of the bearings with the roller supported thereby. When thus arranged, it has been found that the bearings are subject to rather severe wear.

I attribute this difficulty to the fact that the heavy radial load on the bearings induces high frictional resistance to axial movement thereof on their seats and that this resistance imposes an eccentric load tending to rock the bearings out of their normal plane.

An object of the present invention is to eliminate this difficulty. This I have accomplished by a novel combination and arrangement of parts which substantially eliminates objectionable eccentric loading of the bearings.

Other more specific objects and advantages will appear, expressed or implied, from the following description of two illustrative embodiments of the present invention.

In the accompanying drawings:—

Figure 1 is a fragmentary sectional view of a variable speed transmission of the type referred to, constructed in accordance with the present invention.

Fig. 2 is a similar view of an embodiment of the invention involving a different construction.

Both forms of the variable speed transmission shown are similar in many respects to that shown in the copending application above identified. Both include a driven shaft 10, journalled in a bearing hub 11 provided at one end of a housing (not shown), and an aligned drive shaft 12 journalled in the opposite end 13 of the housing and additionally supported by an appropriate bearing 14 seated in a hollow head 15 carried by the driven shaft 10.

A sun gear 16, fixed to the drive shaft 12, meshes with a plurality of planet pinions 17 which in turn mesh with an internal orbit gear 18 fixed to the driven shaft head 15. Each of the planet pinions 17 is fixed to an end of a tapered planet roller 19 which is frictionally engaged with a non-rotatable traction ring 20, the latter encircling the several rollers 19 and coacting therewith to control the planetary motion of the several planet pinions 17 in a well known manner.

The traction ring 20 is shown supported for free radial movement within a carrier ring 21, which is mounted to swing about the axis of a supporting screw shaft 22, journalled in the main housing, all in a manner fully disclosed in the copending application of Walter P. Schmitter and Alfred G. Bade, Serial No. 100,270, filed September 11, 1936. It will of course be understood that the traction ring 20 may be shifted lengthwise of the several rollers 19, to regulate and control their planetary action, by rotation of the screw shaft 22.

The several rollers 19 are journalled at their opposite ends in the end disks 23 and 24 of a spool-shaped rotor 25, the latter being supported in appropriate bearings 26 and 27 on the drive shaft 12 for free rotation about the common axis of the drive shaft 12 and driven shaft 10. As is customary in transmissions of this type, each roller is inclined to the axis of the rotor 25 in such direction and to such degree that the outer extremities of the rollers are tangent to the surface of an imaginary cylinder whose axis coincides with the axis of the rotor and of the traction ring 20.

In the transmission shown in Fig. 1, each end of each roller 19 is journalled in a roller bearing having an outer race-ring 28 fixed in one of the end heads 23 or 24 of the rotor and also having an inner race-ring 29 fixed to an end of the roller. In this instance the inner race-ring 29 of each bearing is fashioned to confine the rollers 30 thereof against longitudinal displacement with respect thereto, but in each bearing the several rollers 30, with their inner race-ring 29, are free to move axially of and with respect to the outer race-ring 28.

It has been found that the rolling contact between the rollers 30 and the outer race-ring 28 offers very little frictional resistance to relative axial movement therebetween so that the tapered rollers 19, when thus mounted, may be axially shifted very easily and without producing wear on the bearings in spite of the heavy radial loads to which they are subjected.

Provision is preferably made for forcing the several rollers 19 outwardly along their inclined axis so as to develop and maintain the required contact pressures between them and the traction ring 20. The means shown for that purpose is similar in many respects to that employed in the copending application first above identified. It comprises a spider 31, carried by a hub 32 which is keyed or otherwise mounted for free axial movement on the rotor 21. The spider 31 is cut away at intervals, as at 33, to accommodate the several rollers 19 and bears against ball bearings 34, fixed on the respective rollers, in such manner as to urge the rollers 19 toward the right (Fig. 1).

In this instance, spider 31 is resiliently urged toward the right by a compression spring 35 confined between a shoulder 36 on the rotor 25 and a nut 37 threaded on the spider hub 32, the tension in the spring 35 being regulated by adjustment of the nut 37.

The transmission shown in Fig. 2 includes a similar spring urged spider 31' which in this instance acts directly upon the outer race-rings 38 of the ball bearings 39, which are slidably seated in the end head 24 of the rotor 25 and which serve to support the smaller ends of the rollers 19. It will be noted that with this arrangement, the friction resistance to axial movement of the outer race-ring 38 is directly overcome by the thrust of the spider 31', so that there is no eccentric loading of this bearing and no tendency for it to tilt out of its normal plane.

The thrust of the spider 31' upon each outer race-ring 38 is transmitted through the balls 39 and inner race-ring 40 to the small end of each roller 19 to which it is fixed, and this thrust, transmitted through each roller to the bearing which supports its other larger end. If a ball bearing of the type just mentioned were employed to support each roller at its larger end, the pull of the roller would tend to rock such bearing on its seat. In order to avoid this, a roller bearing, preferably of the type employed in the device of Fig. 1, is employed to support the larger end of each roller. In this bearing the rollers 41 are axially confined in the inner race-ring 42, which is fixed to the roller, and the rollers 41 and ring 42 are freely movable axially within an outer race-ring 43 fixed in the end head 23 of the rotor 25.

Various changes may be made in either embodiment of the invention hereinabove specifically described without departing from or sacrificing the advantages of the invention as defined in the appended claims.

I claim:—

1. In a variable speed transmission the combination of a rotor, a plurality of inclined tapered planet rollers rotatable with and with respect to said rotor, an encircling traction ring in pressure engagement with said rollers and shiftable lengthwise thereof to regulate their planetary motion, and means for supporting said rollers against the pressure reaction of said ring and permitting relative axial movement between said rollers and rotor, said supporting means including an anti-friction bearing for each roller having inner and outer race rings engaged with said rotor and one of said rollers respectively, and rollers between said rings permitting relative axial movement therebetween.

2. In a variable speed transmission the combination of a rotor, a plurality of inclined tapered planet rollers rotatable with and with respect to said rotor, an encircling traction ring in pressure engagement with said rollers and shiftable lengthwise thereof to regulate their planetary motion, and a pair of anti-friction bearings in said rotor for supporting the opposite ends of each roller against the pressure reaction of said ring, each of said bearings comprising inner and outer race rings respectively engaged with said rotor and roller, and rollers between said rings permitting relative axial movement therebetween to thereby permit relative axial movement between said rotor and roller.

3. In a variable speed transmission the combination of a rotor, a plurality of inclined tapered planet rollers rotatable with and with respect to said rotor, an encircling traction ring in pressure engagement with said rollers and shiftable lengthwise thereof to regulate their planetary motion, an anti-friction bearing for sustaining each roller against the pressure reaction of said ring, said bearing comprising inner and outer race rings respectively engaged with said roller and rotor, and rollers between said rings permitting relative axial movement therebetween, and means for effecting relative axial movement between said planet rollers and rotor.

4. In a variable speed transmission the combination of a rotor, a plurality of inclined tapered planet rollers rotatable with and with respect to said rotor, a traction ring encircling said rollers and movable lengthwise thereof to regulate their planetary motion, bearings in said rotor for supporting said rollers at one end, means acting on said bearings for effecting relative axial movement between said rollers and rotor, and bearings in said rotor for supporting said rollers at the other end, each of said last named bearings comprising inner and outer race rings respectively engaged with one of said rollers and rotor, and rollers between said rings axially movable with respect to one of said rings.

5. In a variable speed transmission, the combination of a rotor, a plurality of relatively inclined tapered planet rollers rotatable with and with respect to said rotor, an encircling member in pressure engagement with said rollers and movable lengthwise thereof to regulate their planetary action, and means including an anti-friction bearing between each of said rollers and said rotor for sustaining the pressure reaction of said member and for permitting relative lengthwise movement between said rollers and rotor, said bearing comprising a plurality of roller elements interposed between and engaging coacting raceways on said rotor and roller respectively and axially shiftable relative to one of said raceways.

THOMAS BARISH.